United States Patent [19]

Norris

[11] 4,227,782
[45] Oct. 14, 1980

[54] CARD MOTION PICTURE PROJECTION SYSTEM

[75] Inventor: Philip R. Norris, North Reading, Mass.

[73] Assignee: Polaroid Corporation, Cambridge, Mass.

[21] Appl. No.: 47,141

[22] Filed: Jun. 11, 1979

[51] Int. Cl.³ .......................................... G03B 41/00
[52] U.S. Cl. ...................................... 352/82; 352/40; 352/203
[58] Field of Search ...................... 352/38, 40, 41, 82, 352/83, 203

[56] References Cited

U.S. PATENT DOCUMENTS

| | | |
|---|---|---|
| 1,210,887 | 1/1917 | Bettini . |
| 1,231,961 | 7/1917 | Stoffels . |
| 1,933,057 | 10/1933 | Harkin . |
| 2,905,048 | 9/1959 | Miller . |
| 2,950,644 | 8/1960 | Land et al. |
| 3,218,114 | 11/1965 | Grey . |
| 3,252,372 | 5/1966 | Gallina . |
| 3,450,468 | 6/1969 | Davidson et al. |
| 3,459,111 | 8/1969 | Cooper . |
| 3,684,359 | 8/1972 | Land . |
| 3,721,491 | 3/1973 | Downey . |
| 3,724,935 | 4/1973 | Batter . |

Primary Examiner—Monroe H. Hayes
Attorney, Agent, or Firm—David R. Thornton

[57] ABSTRACT

A photographic projection apparatus for use with a film unit which has a plurality of images formed in a plurality of arcuate rows thereon supports the film unit between a light source and an optics system, both of which move along an arcuate path corresponding in shape to that of the arcuate rows of images on the film unit. The film unit is intermittently moved in a direction normal to the scan of the image rows so as to provide a sequential scan of the images in successive rows whereupon the images are projected onto a screen.

24 Claims, 11 Drawing Figures

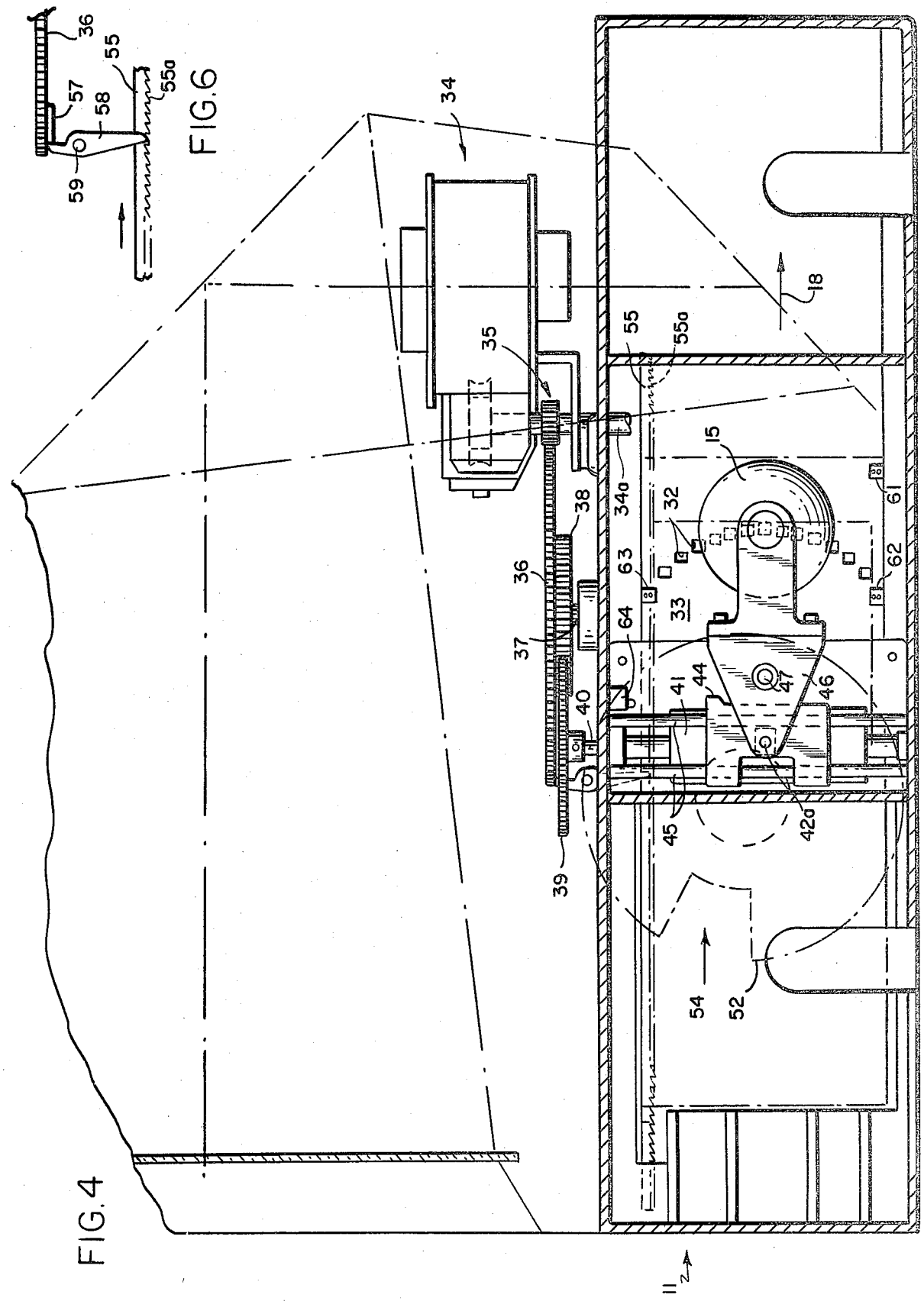

CARD MOTION PICTURE PROJECTION SYSTEM

BACKGROUND OF THE INVENTION

This invention relates generally to motion picture projection systems and, more particularly, to systems which utilize a plurality of separate film having a plurality of film images thereon as opposed to utilizing continuous reels of film therefor.

Present day motion picture taking and projection systems utilize continuous reels of film in which a plurality of sequentially produced images are vertically positioned along a continuous film roll during the picture taking process; reels of 50 feet, 100 feet, 1,000 feet, etc. being utilized to store such rolls of film images. During projection onto a screen, each of the sequentially filmed image transparencies on a film roll are vertically and intermittently moved past a suitable light and optical system so as to be intermittently projected onto a screen via an appropriate projection lens system at a rate which provides to the viewer a substantially continuous motion of the projected images on the screen.

A problem in such conventional motion picture systems lies in the difficulty in evaluating a scene which has been taken until the entire film roll has been utilized and developed for projection. Even where substantially instantaneous development can be achieved, such evaluation must often await the projection of a significant portion of a film roll containing a large number of different scenes before a particular scene can be looked at for such evaluation.

It is desirable, therefore, to design a motion picture taking system in which scenes of average length (e.g., the time of an average scene is often about 10–15 seconds) can be more easily evaluated without having to review other scenes of no particular interest at the time. Such a design also makes it possible to view such relatively short scenes substantially immediately after taking, either in transparency form or in projected form.

One approach to such a problem which has been suggested in the past to form a plurality of sequentially produced images on a relatively larger transparency film unit, or plate. An entire motion picture can be obtained by providing a plurality of such plates for sequential use in taking or projecting. Such systems have not found favor because the format of such sequentially produced images on the plate and the mechanisms for producing such format have not been acceptable in terms of the size or capability thereof to produce effective motion picture image projection.

For example, some techniques have suggested the use of a fixed lens system coupled with a movable plate, the latter being capable of movement in two orthogonal directions so that the multiple images are placed thereon in parallel rows. Since the plate must move from one side to the other as it passes adjacent the lens system, the camera housing must be at least twice the width of the plate itself and, hence, the size of the camera has become so unwieldy that its use is awkward and undesirable. Other suggested techniques using a substantially fixed optics system have required the photographic plate to be moved in a spiral or ring configuration which requires rather complex mechanical structures for guiding the plate movement in the correct direction.

Still other suggestions have involved the use of systems where both the plate and the optics system move, the plate normally moving in a first direction and the optics moving in an orthogonal direction. In such cases the plate remains in a fixed position while the lens system, in effect, scans the plate in a fixed linear direction orthogonal to the plate's motion, the plate moving forward between each orthogonal scan so that parallel rows of images are obtained. At the end of each lateral orthogonal scan, the optics is required either to fly back rapidly to its initial position for the next scan or to scan in the opposite direction for alternate rows of images. Placing the images on the film in parallel rows utilizing a moving lens axis, the translational motion of the lens being either perpendicular or parallel to the lens viewing axis, tends to cause an uncomfortable illusion to the viewer of rhythmic camera motion when viewed by a projection system. Moreover, the lens axis in either case (whether the lens axis is parallel or perpendicular to the optics system motion) changes position with respect to the scene being taken.

In view of such problems, it is desirable to design a system utilizing a plurality of separate film transparency units, each of which has multiple images thereon, in which the illusion of rhythmic camera motion in the projection of such iamges can be avoided. Picture taking apparatus for such purpose is described in the commonly assigned copending applications entitled "Card Motion Picture Camera System", Ser. No. 47024 and "Card Motion Picture Camera", Ser. No. 32950, filed on the same day as this application, and incorporated herein by reference, wherein the taking axis of the camera is scanned in an arc within the camera housing during the picture taking process to simplify the exposure mechanics.

It is desirable to utilize similar principles of operation in projecting the images taken by such a picture taking apparatus so that the projected images can provide a continuous motion of the action depicted therein while avoiding the illustion of a rhythmic camera motion during the viewing of the projected images.

SUMMARY

In accordance with the invention, the projection apparatus is provided for use with sheets of photographic film for projecting images recorded thereon in a plurality of arcuate rows and includes means for supporting the film sheet in a film plane for movement in a direction substantially normal to the arcuate rows, optical means for illuminating each image and for directing light therefrom along a given optical path from the film plane, the optical means being mounted for movement of a boom-like portion thereof along an arcuate path generally laterally of the film direction to thereby illuminate and direct light from each image in a given row, and the apparatus includes a drive arrangement for alternately moving the film in its given direction and the optical boom along the arcuate path to project images from any of the plurality of arcuate image rows. More specifically, for producing motion pictures the drive arrangement alternately and intermittently displaces the film and the optical boom to sequentially project the images of successive rows. Briefly, the method of projecting motion picture film having images recorded thereon in a plurality of successive arcuate rows includes moving a source of illumination in an arcuate path conforming to the arcuate path of a row of images while simultaneously moving an optical arrangement for directing light from each image to a viewing screen into registration with each image as it is illuminated, then advancing the film sheet, at the completion of projection of an arcuate row, in a direction substantially normal to the arcuate path and a distance equal to the distance between image rows to provide an unprojected image row in registration with the source and said optical arrangement, and repeating said directing and advancing steps to sequentially project each image of each of the image rows in the film sheet.

In a preferred embodiment, the image projection apparatus utilizes an optics system mounted on a first rotatably movable boom and a lighting system mounted on a second rotatable boom, the arcuate path of which corresponds to that of the first movable boom such that their pivoting axes are substantially parallel. The output rays from the optics system are then suitably further directed by appropriately located mirrors and lenses to a screen.

The optics boom (or both booms) provides a pair of light paths offset from, but parallel to, one another such that regardless of the angular position of the boom during its rotation, the axis of the light rays directed from he film transparency unit remains effectively fixed relative to the projector housing, and the size and focus of the images projected on the screen are the same as each image is projected thereon. Appropriate gating mechanisms effectively positioned at the plane of the film transparency unit are utilized to delineate each image frame as the optics system boom rotates.

DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of the preferred embodiment when read in connection with the accompanying drawings wherein like numbers have been employed in the different figures to denote the same parts and wherein:

FIG. 4 shows in detail a diagrammatic plan view partially in section along the lines 4—4 of FIG. 3 of a portion of the illustrated projector system for providing movement of the light source thereof;

FIG. 6 shows a view of a portion of the belt drive mechanism of FIGS. 3 and 5;

DESCRIPTION OF THE PREFERRED EMBODIMENTS

Figure 1:
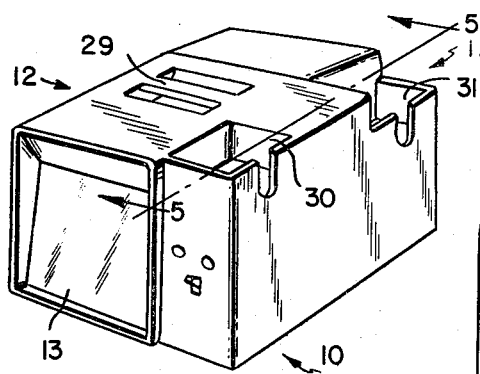
FIG. 1 shows a perspective exterior view of a projector provided in accordance with the invention.
Figure 2:
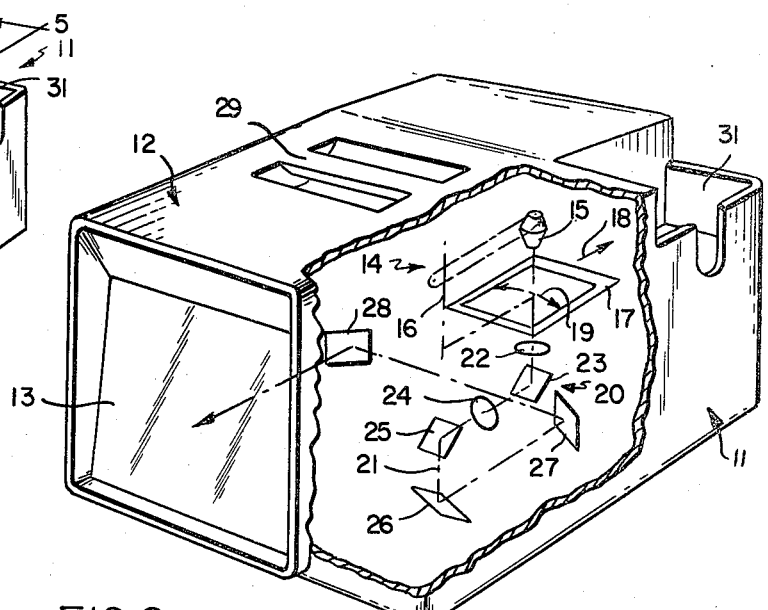
FIG. 2 shows the apparatus of FIG. 1 with a portion thereof cut away to show in diagrammatic form the path of the light and projected image rays achieved by the system of the projector in accordance with the invention.

As can be seen in the perspective views of FIGS. 1 and 2, a projector 10, in accordance with the invention, utilizes a housing having a first portion 11 which includes a lighting system and a first portion of an optics system while a second portion 12 of the housing includes a portion of a mirror system of the projector for providing a projected image which is directed to a viewing screen 13.

A partially cut away, diagrammatic view of portion 11 of projector 10, as depicted in FIG. 2, shows a movable lighting system 14 having a suitable light source 15 which is mounted so as to pivot about an axis 16. A film transparency unit 17 of the type, for example, shown and described in the above-referenced copending applications, is displaced along the direction of arrow 18 coaxial with the longitudinal axis of the film unit in an intermittent manner with the light rays from light source 15 arranged in an arcuate scanning mode to pass sequentially through each of the arcuately arranged images in any one row thereof when the film unit is in each of its step positions. When the film unit 17 is at a given step position, the light source moves along an arcuate path in one direction, and when the film unit moves to its next position the light source moves along the arcuate path in the opposite direction. Accordingly, the light rays pass through alternating rows of arcuate images in different directions as the lighting system 14 is pivoted reciprocally along arcuate path 19, the direction of motion thereof being effectively perpendicular to the direction of motion of film unit 17 along the direction of arrow 18.

An optics system 20 also pivots about an axis 21 which coincides with axis 16 of light system 14 so as to rotate in a corresponding reciprocal manner along the direction of arrow 19. Light rays from source 15 pass sequentially through the images in film unit 17 along a first path or axis 22a to a lens 22 which projects such image-forming light rays to a mirror 23. The latter in turn reflects such light rays along a second axis 24a normal to the first axis and through a lens 24 to a mirror 25, all of such elements mounted in an appropriate boom member not shown in FIG. 2, but later discussed in more detail below, for pivoting about a third axis, axis 21, which is parallel to an offset from the first axis defined by the light source 15 and lens 22. Accordingly, in a similar manner to the camera structure described in the aforementioned commonly filed applications, the image scan is provided without change in the path length from the film 17 to the output axis 21.

For compactness of the apparatus and convenience of viewing, the reflected image-forming light rays are thereupon transmitted from the axis 21 along a path via mirrors 26, 27 and 28 and ultimately to screen 13 so as to project an optical image thereon. Alternatively, the image may be projected externally of the apparatus via a projection lens to an external screen (not shown).

The projector 10 is compactly constructed and can be readily carried by recessed handle 29. A plurality of stacked transparent film units which, as discussed in the above-referenced copending applications, may be in the form of film cards, can be loaded in the projector at recessed input loading bin 30 from which bin they are successively moved one at a time past the lighting and optic system to an output storage bin 31 where they are stacked for storage and readily removed.

While FIGS. 1 and 2 show diagrammatically the overall operation and optical paths involved in the system of the invention, the detailed aspects thereof are shown more clearly in FIGS. 3–6, as discussed below. As seen in the sectional view of FIG. 4, with particular reference to portion 11 of the overall projector apparatus of FIG. 2, light source 15 moves in a generally arcuate path about its pivot axis 16, the arcuate path corresponding to that formed by a plurality of apertures 32 of a fixed light gating plate or aperture plate 33. As a film unit moves intermittently along the direction of arrow 18 (see FIG. 4) beneath light source 15, the arcuate rows of film images thereon move into sequential registry with such fixed gate apertures. The film unit remains in a fixed position while the light source travels from one end of the plurality of arcuate apertures 32 to the other. The film unit is then moved to its next sequential position so that the next adjacent row of film images is positioned in registry under the fixed gate apertures, at which time the light source then moves back in an opposite direction along the arcuate path of apertures 32. The film continues its step-like linear movement while the light source continues its reciprocal arcuate motion until all of the rows of film images have moved into registry with apertures 32.

As shown in detail in FIG. 4, the pivoting movement of light source 15 (and the optics system 20 discussed in more detail below) is effected by the use of a motor 34, the shaft 34a of which drives a gear 35 which in turn drives a main gear 36 mounted on the housing via shaft 37. A secondary gear 38 also mounted on such shaft drives a gear 39, which in turn rotates a shaft 40 on which is mounted barrel cam 41. Rotation of barrel cam 41 causes cam follower 42 (see FIG. 3) to move along the groove 43 of cam 41 in such a way as to cause guide member 44 to move continuously in a reciprocating manner from one end to the other along guide rails 45.

Guide member 44 is attached by a pivot post 42a to one end of bracket 46, the other end of which has light source 15 attached thereto. Bracket 46 is mounted so as to rotate, or more precisely pivot, about shaft 47 (i.e., coinciding with the illumination pivot axis 16 shown in FIG. 2) so that the illumination, or that is, in this embodiment, light source 15 moves in the desired arcuate path.

Figure 3:
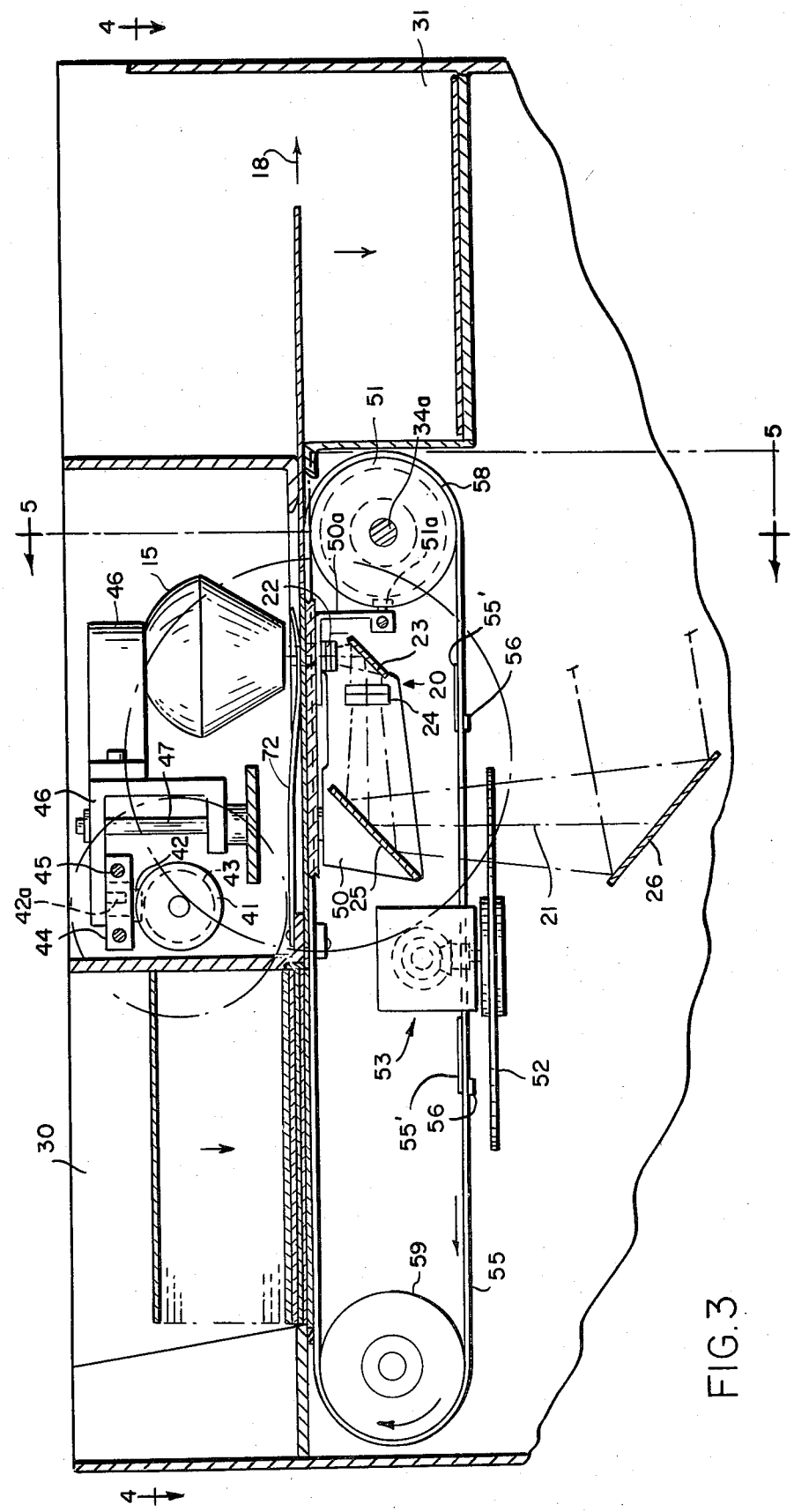
FIG. 3 shows in detail a side view in elevation, partially in section, along the lines 3—3 of FIG. 1.

The motion of optics system 20 is substantially similar to that described with reference to the motion of the optics system in the copending applications described in connection with the motion picture camera disclosed therein. Thus, as shown in FIG. 3, the mirrors 23 and 25 and lenses 22 and 24 are mounted on a boom member 50 and are caused to move in a step by step manner reciprocally about axis 21 such that lens 22 and mirror 23 move intermittently along an arcuate path corresponding to that of light source 15 in accordance with the motion imparted via a barrel cam 51 through a cam follower 51a and appropriate mechanical coupling 50a therefrom to the boom which is driven from shaft 34a of the motor 34. The details thereof are substantially the same as those shown in the aforementioned applications and need not be described again here.

In this embodiment, the lamp 15 is moved continuously from one end of the arcuate path to the other to avoid the high acceleration of stop and start motion which can produce increased noise and also be detrimental to the lamp filament. However, in any case, the overall pivoting motion of light source 15 and optics boom 50 are coordinated so that they move reciprocally across their respective arcuate paths in synchronism, the light from source 15 thereby being transmitted through the transparent images in registry with gate apertures 32 and thereupon being appropriately directed by the mirror and lens system for ultimate projection on frosted glass screen 13 of the projector apparatus.

A suitable shutter means 52 is actuated by bevel gearing 53, such shutter means rotating at a speed such that shutter opening 54 (see FIG. 4) passes between mirrors 25 and 26 each time light source 15 and mirror 23 are in registry with a film image in each arcuate path.

The coordinated movements of the light source, optics boom, and shutter means provide a continuous motion of the action in the projected images, while at the same time avoiding any illusion of a rhythmic motion during the viewing thereof.

Advancement of the film unit, both intermittent step motion for image projection and more continuous motion for film input or editing etc., are produced by a thin, narrow, endless belt 55 (see FIGS. 3–5) of suitable material such as metal having a serrated rack-like edge 55a and carrying a plurality of picks 56 thereon which are appropriately spaced so that as one pick moves a given film unit into the output bin 31, following the projection of all of the images thereon, the next of the picks comes into contact with the trailing edge of the next film unit at the bottom of input bin 30 so as to move such film unit into a position at which its first row of arcuate images is aligned in registry with the fixed apertures 32 of gate 33 ready for projection. The serrated edge 55a of the belt 55 is employed for the step motion of the film and, as can be seen in more detail in FIG. 6, gear 36 has a cam finger 57 thereon so that at each rotation thereof cam finger 57 comes into contact with a rotatable advance lever 58 so as to cause such advance lever to rotate in a counterclockwise direction about a pivot axis 59. Such counterclockwise motion causes the lower tip of advance lever 58 to move to the right in FIG. 6. A projecting element (not shown) extending perpendicularly to the tip of advance lever 58 extends into the toothed notches of belt member 55 thereupon causing the belt to move a short distance (equal to the recorded image height plus the small row separation) to its next step position so as to move the film unit in such a manner that the next adjacent row of arcuate images is moved into registry with the fixed gate apertures 32.

The spacing of the picks 56 along the belt 55 is equal to the length of a film unit plus the distance between the film unit and the next (preferably in the order of 0.080 inch) as the units progress from the loading bin 30 across the focal plane to the storage bin 31. Consequently, once projector operation is underway, each film unit undergoing projection is preceeded by the previously projected unit and followed by the next unprojected unit; image projection however, being provided at any given time only for images in the image row positioned at the spaced, arcuately arranged film plane locations in registry with apertures 32 (see FIG. 4).

Figure 5:
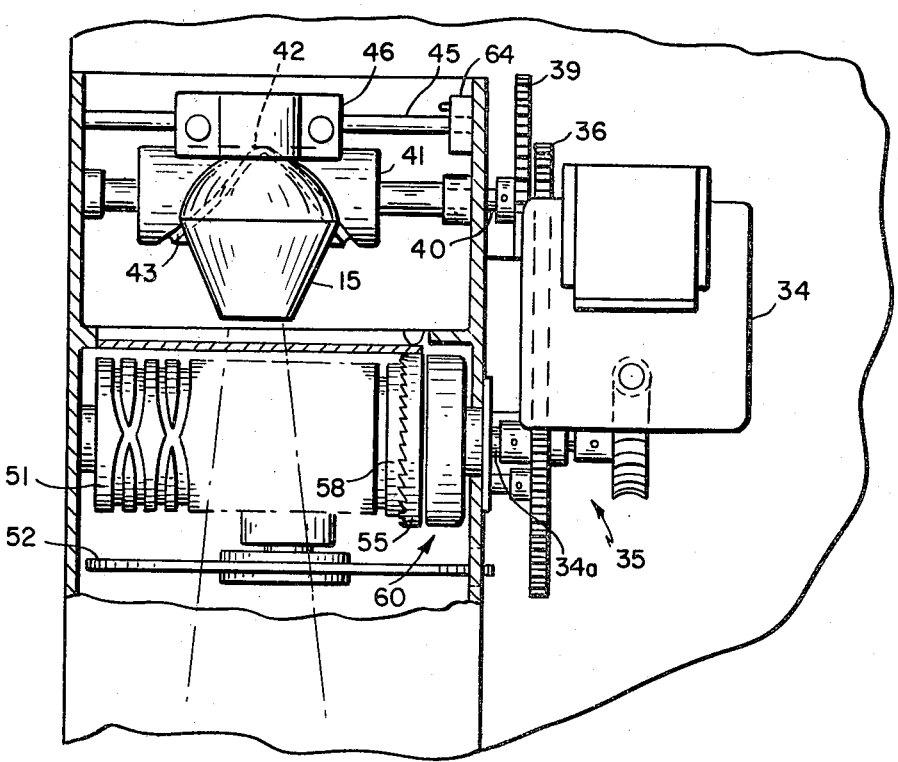
FIG. 5 shows in detail an end view in elevation, partially in section, along the lines 5—5 of FIG. 1.

As shown in FIGS. 3 and 5, the belt 55 is mounted in a tensioned condition on spaced roller 58 and 59, the roller 58 being located in adjoining relation to the trailing edge of the film stack in output bin 31 while the roller 59 is in adjoining relation to the trailing edge of the film stack in input bin 30 such that the belt 55 extends throughout the length of the film in input bin 30 and across the projector focal plane to the edge of the output bin 31.

It is desirable that the shift-over from one film unit to the next be rapid, or that is, that the movement of each of the film units from the input stack into registry with the gating apertures 32 for projection and the subsequent movement of that film unit from its registry position during projection into the output bin 31 be performed continuously and rapidly so that the shift from projection of the first selected image (assuming editing) of one film unit and the first selected image of the next film unit can be achieved relatively smoothly and rapidly.

Figure 8:
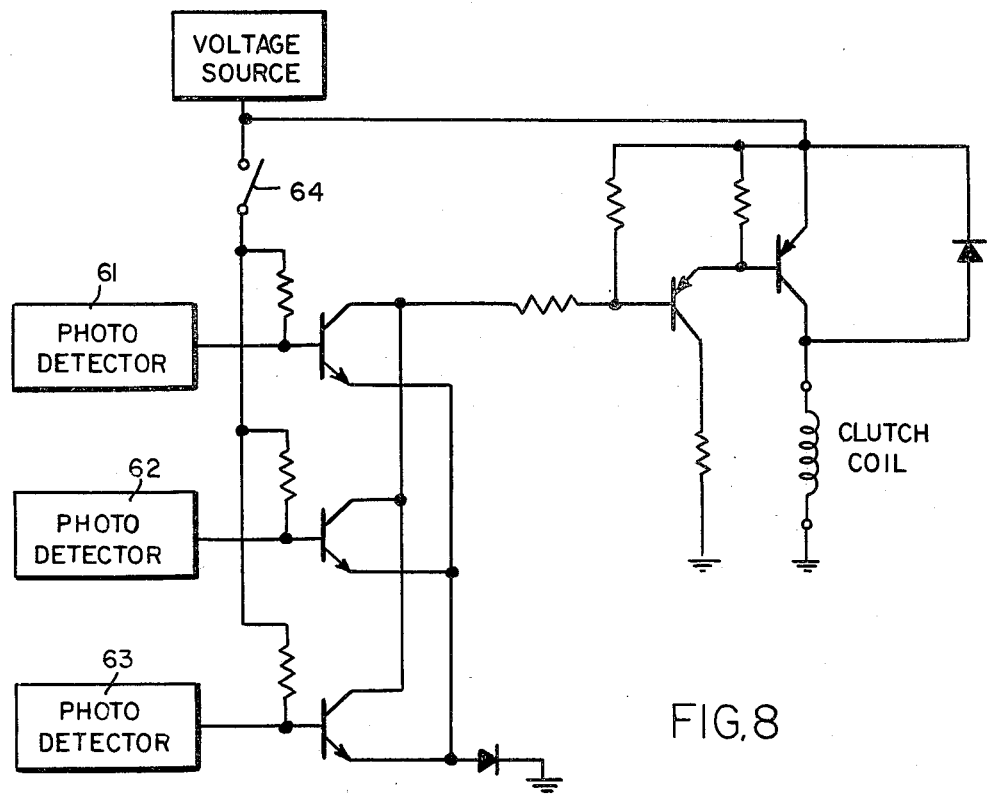
FIG. 8 shows circuitry for actuating a clutch mechanism in the system depicted in FIGS. 1-6.

For rapid motion, the belt 55 is driven directly from the motor 34 by way of an electromagnetic clutch 60 (see FIG. 5). In this regard, the belt roller 58 is mounted for independent rotation around or concentric to the barrel cam 51 and the motor input shaft 34a, and the clutch 60 is actuatable via suitable clutch actuation circuitry, such as exemplarily shown in FIG. 8, to couple the belt roller 58 to motor shaft 34a. Energization of such circuitry to provide appropriate actuation current for the clutch coil shown in FIG. 8 is achieved by using a plurality of film position detectors such as commercially available photodetection devices 61, 62 and 63 (FIG. 4) two of which (devices 61 and 62) are positioned in the path of travel of one edge of a film unit as it passes under gate 33 and the other of which (device 63) is placed beneath belt 55, as shown. Such devices, for example, include a photocell and a light emitting diode arranged with the diode projecting light onto a surface such as the edge of the film unit or the underside of belt 55. If such surfaces are "white" (light reflective) the light is reflected to the photocell to thereby produce a given condition in the cell, while if such surfaces are "black" (light absorbent) no light is reflected to the photocell and hence, an opposite condition of the cell exists.

Figure 9:
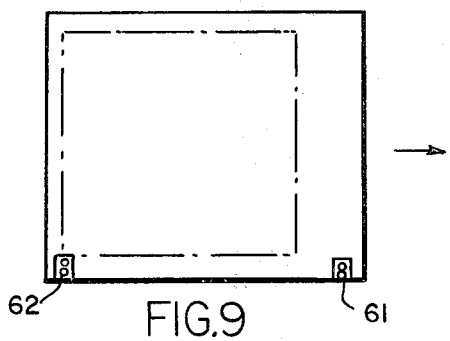
FIGS. 9-11 depict film units in various positions in the system of FIGS. 1-6.

So long as either one of photodetection devices 61 or 62 detects a blackened condition, the clutch circuitry is actuated so that belt 55 is directly dirven by motor 34 so that a film unit whose trailing edge is in contact with a pick on the belt is moved rapidly (e.g., from left to right in FIG. 4). Thus, by such operation a film unit is rapidly moved from input bin 30 into registry with gate 33 or from its position in registry with gate 33 to output bin 31. In the former case, for example, when the forward edge of a film unit 17 moves to a position opposite photodetection device 61, the device detects the "white" edge thereof (see FIG. 9). At the same time, device 62 also detects the white edge thereof. Since neither photodetection device 61 or 62 detects a blackened condition, the clutch is in its released state and the relatively slow, intermittent movement of the film unit, as discussed above, commences during the projection mode of operation.

Figure 10:
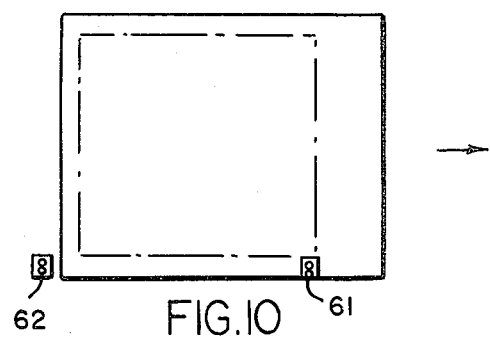

When the trailing edge of film unit 17 passes beyond photodetection device 62 so that light is no longer reflected therefrom, as depicted in FIG. 10, the photodetection device thereupon detects a black condition and the clutch is appropriately actuated by the circuitry of FIG. 8 so that the film unit is again rapidly moved from left to right.

Figure 11:
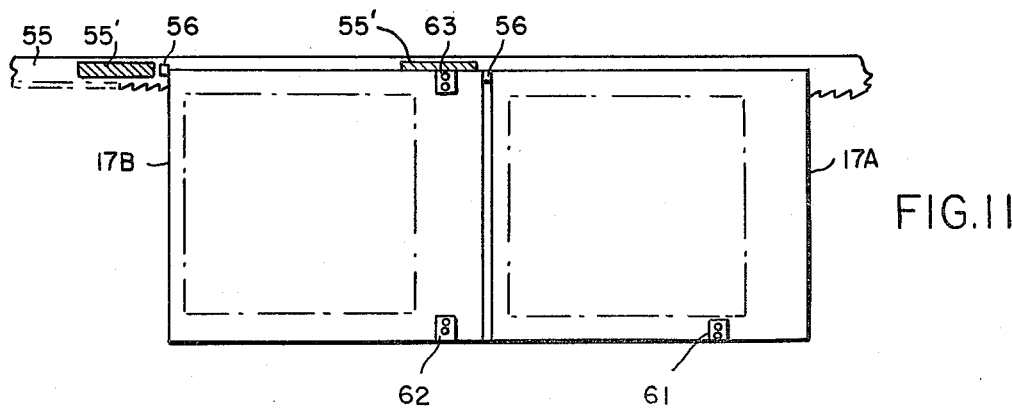

When shifting projection from one film unit to the next and hence, two successive film units are being moved respectively out from and into the desired projection position in registry with gate 33, a condition such as that shown in FIG. 11 occurs in which the trailing edge of the leading film unit 17A is spaced from the forward edge of the next film unit 17B. In such a case, neither photodetection device 61 nor 62 will detect a blackened condition and the desired rapid motion of unit 17A out of its registry position and of unit 17B into its registry position will not continue. Under such a condition, the system utilizes the third photodetection device 63 positioned adjacent belt 55. The underside of belt 55 is blackened at those regions 55' which extend backward from the picks 56 thereof (FIGS. 5 and 11) so that, even if photodetection devices 61 and 62 both detect a white condition at the edges of film units 17A and 17B, photodetection device 63 detects the blackened condition of belt region 55' and actuates the clutch so as to provide the desired rapid motion of the respective film units out of and into registry, as desired.

The film is stopped after each advance by means of a film hold-down spring 72 (see FIG. 3) which not only holds the film unit in a flat condition in the focal plane, but also provides enough frictional drag to rapidly stop the film as soon as the driving forces on the belt 55 cease. This, in turn, requires that the belt 55 and its drum 58 have low inertia; the latter being accomplished by providing a thin, lightweight belt mounted on a thin cylinder 58.

In a preferred embodiment of the invention, it is desirable that the photodetection circuitry not be energized continuously, but only at selected times during the operation of the apparatus. For this purpose, a scan detector, such as a switch 64, is suitably positioned as, for example, on the housing adjacent one end of the travel of guide member 44 (FIG. 5). Such switch is actuated each time that guide member 44 ends a complete reciprocal movement corresponding to the reciprocal motion of light source 15 and optics boom 50 as they scan two adjacent arcuate rows of images. Photodetection devices 61, 62 and 63 are energized only when switch 64 is actuated. Accordingly, the photodetection components test the conditions for determining whether clutch 60 should or should not be actuated only at the end of each reciprocal scan of two adjacent arcuate rows of images.

If desired, an additional shutter means (not shown) can be utilized and actuated only during the rapid motion mode of operation so that the screen 13 remains darkened as the film units are rapidly moved from one position to another until the next pair of arcuate rows of images are scanned for projection.

The use of photodetection devices for actuating clutch 60 permits the projection of images on film units 17 to be appropriately edited, as desired. Thus, if only selected rows of images on a particular film unit are to be projected, the side edge of the film unit can be suitably darkened so that as the darkened portion passes a photodetection device, the film unit is rapidly moved into and out of registry, as discussed above, at selected registry position thereof, as desired. During the intervening position, or positions, the selected arcuate rows of images are positioned so that they can be suitably scanned for projection. An exemplary "edited" film unit, for example, may have a portion of its trailing side edge blackened so that only the arcuate rows of images at the forward part of the film unit are projected. As soon as scan detector switch 64 is actuated and the blackened portion of the film unit is detected by photodetection device 61, for example, the film unit is rapidly advanced from its registry position so that the next film unit is moved into its registry position. Re-editing can occur merely by whitening out the previously blackened portions as desired.

Since the pair of photodetectors 61 and 62 which monitor the white border of the film unit are spaced apart a distance substantially equal to the length of the film unit to provide rapid advance of the film unit when either of the pair of detectors senses a dark surface, for example the leading or trailing edges of the film unit, if the film border is altered, for example by blackening of its edge, for a length at least equal to the distance from the beginning of one image row to the next, the film unit will be rapidly moved as soon as the condition is sensed and the corresponding row will not be projected. Hence, if the border adjoining the leading edge is blackened (or even removed) for a length equal to several row lengths, the leading equivalent rows will not be projected. Of course, the same is true for trailing image rows upon blackening of the border adjoining the trailing edge.

While the above embodiment discloses the use of photodetection devices for detecting film position operable in accordance with a white or black characteristic of the film unit and belt surface and a switch 64 as a scan detector, other means for sensing the position and characteristic of the film unit and scan system can be used. For example, the switch 64 may be replaced by a photodetector, and any or all of the detectors may employ conductive strip elements. The latter may be particularly suitable for the belt detector. Further, these various elements may carry cutouts or other tactile discontinuities for cooperation with photodetectors or mechanically actuated switches.

Figure 7:
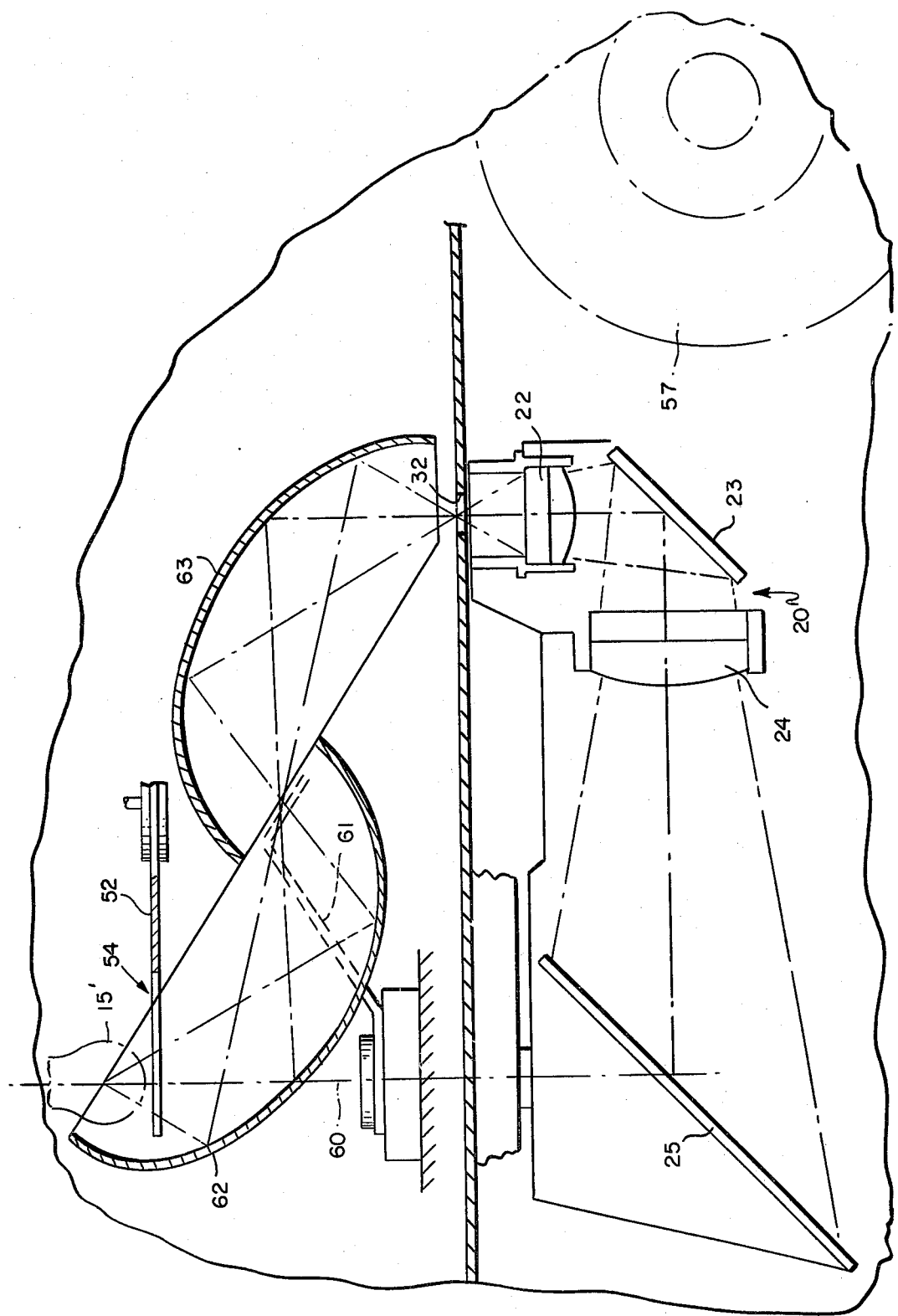
FIG. 7 shows a side view in elevation of an alternative embodiment of lighting means of the projector system of FIGS. 1-6.

Turning again to the light scanning arrangement, it should be noted that while the above embodiment discloses the use of a continuously moving light source for effectively supplying light directly from the source to the film unit images, the lighting means may be arranged to use a light source 15' which, as shown in FIG. 7, can be fixedly mounted to the housing in any suitable manner (not shown). A movable boom member 61 is arranged for rotation around an axis 60 in a manner similar to that previously discussed above with reference to the pivoting bracket 46 and the moving light source 15 of FIGS. 2-5, for example. In the case of the fixed light source 15', boom member 61 has suitably affixed thereto a first ellipsoidal reflector 62 and a second ellipsoidal reflector 63. The reflector 62 is positioned substantially as shown at the axis of rotation 60 of boom 61 with light source 15' mounted above this reflector on the same axis. Light from source 15' is directed to reflector 62 which in turn transmits a beam of reflected light therefrom to the second reflector 63 from which the light beam is in turn reflected downwardly. Advantageously, both reflectors 62 and 63 are mounted for pivotal motion around the axis 60 so that the downwardly reflected light beam moves in an arcuate path in registry with the gating apertures 32 with any change in the beam path length. The associated optics system 20 shown in FIG. 7 is essentially the same as that previously depicted in FIGS. 2-5.

The lighting boom 61, having lower mass than, and lacking the delicate filament of the light source 15 of the preferred embodiment, may be driven in an intermittent, step by step manner, in exact synchronism to the optics boom 20 rather than continuously scanning as previously described. Hence, in this embodiment, both booms 20 and 61 are preferably driven from a common element, for example, from the optics boom 20 or its barrel cam 51 (FIG. 3), by a transmission linkage (not shown) which extends around the lateral edge of the focal plane. Advantageously, intermittent movement of the lighting boom stops or holds the light beam in a fixed position over each image and thereby reduces detrimental effects that can be observed in the viewed image resulting from moving a light beam, having some non-uniformity of light output across the image area during a significant portion of the projection of that image. A further advantage is that the rotating shutter 52, described in regard to FIG. 3 of the earlier embodiment, may be mounted in the light path, between the fixed lamp 15' and the beam entrance to the boom 61 as shown in FIG. 7, to thereby reduce the heat received by the film.

The particular embodiments of the apparatus of the invention as described above are not intended to represent the only embodiments of the invention, as modifications thereto within the spirit and scope thereof will occur to those in the art. Thus, the film unit may be of any type which produces positive or negative transparent images. Further, while the projector is specifically depicted as being for use in projecting motion pictures, it may also be adapted for projecting a plurality of separate still images on one or more film units.

Hence, the invention is not to be construed as limited to the specific embodiments described above except as defined by the appended claims.

What is claimed is:

1. Projection apparatus for use with at least one sheet of photographic film having images recorded thereon in a plurality of arcuate rows, said apparatus comprising:
    means for supporting said film sheet for movement in a direction substantially normal to said arcuate rows and in a given film plane;
    optical means for illuminating one of a row of images located at a projection location in said film plane and for directing light therefrom along a given optical path from said projection location to a viewing screen so as to project the image thereon;
    means for mounting said optical means for movement of at least a portion thereof along an arcuate path generally laterally of said first direction so as to thereby illuminate and direct light from any image in said row of images; and
    drive means for alternately moving said film in its said given direction and said portion of said optical means along its said arcuate path to thereby project one or more images from any of said plurality of arcuate image rows.

2. The apparatus of claim 1 wherein said drive means includes means for intermittently moving said portion of said optical means along its said arcuate path to thereby sequentially project each image of a given row.

3. The apparatus of claim 2 wherein said drive means includes means for reversibly moving said portion of said optical means over an arcuate path of selected scan length, and means for moving said film sheet in its said given direction at the end of each scan of said optical means.

4. The apparatus of claim 1 wherein said drive means includes means for moving at least a portion of said illuminating means continuously along said arcuate path and for moving a portion of said directing means intermittently over said optical path.

5. The apparatus of claim 1 wherein said means for illuminating is located on one side of said film plane so as to illuminate an image section of one side of said film sheet, and said means for directing is located on the other side of said film plane for directing image light emanating from said one side to said viewing screen.

6. The apparatus of claim 1 wherein said means for illuminating includes a source of light, means for directing said light from said source along a first axis from said source, then along a second axis at an angle to said first axis and then along a third axis offset from but parallel to said first axis, and means for mounting said illuminating means for pivotal motion of said second and third axes around said first axis.

7. The apparatus of claim 1 wherein said optical means includes means for initially directing light rays from said film sheet along a first axis, for then directing said rays along a second axis at an angle to said first axis, and for subsequently directing said rays along a third axis offset from and substantially parallel to said first axis; and said drive means includes means for pivoting said first and second axes around said third axis such that the input to said first axis transcribes said arcuate path.

8. The apparatus of claim 7 including gating means located along said third axis for defining each sequential image as said optical means portion is moved through its arcuate path.

9. The apparatus of claim 7 including fixed gating means for defining each sequential image, said fixed gating means including defining a plurality of apertures located along an arcuate path conforming to the arcuate path of an image row.

10. The apparatus of claim 1 wherein said drive means includes a belt carrying a plurality of picks spaced apart a distance at least just exceeding the length of said film sheet as measured in said first direction, and means for advancing intermittently said belt to bring one of said picks into engagement with a trailing edge of the film sheet to advance the sheet in conjunction with advancement of said belt.

11. The apparatus of claim 10 wherein said drive means includes first drive means for intermittently advancing said belt at the end of each scan of a row of images a first predetermined distance essentially equal to the distance between rows to thereby locate the next successive row in position for projection.

12. The apparatus of claim 10 additionally including detector means for sensing when the last of a selected group of rows has been projected, and wherein said drive means includes second drive means responsive to said detector means for rapidly advancing said belt a second distance greater than said first distance to move other than the next successive row into the projection location.

13. The apparatus of claim 12 wherein said detector means senses a given condition of said film sheet, said given condition being alterable for editing said film sheets moving said film sheet rapidly from one row of images over one or more successive rows of images.

14. The apparatus of claim 12 including means for precluding operation of said second drive means except when said optical means is at the end of its arcuate path.

15. The apparatus of claim 1 further including first containing means for holding a plurality of said film sheets each being capable of being moved sequentially from said first containing means into registry with said optical means, and second containing means for holding a plurality of said film sheets and capable of receiving film sheets which are sequentially moved from said registry into said second containing means.

16. The apparatus of claim 15 further including means for rapidly moving a film sheet into and out of said registry.

17. The apparatus of claim 15 wherein said moving means includes sensing means for detecting a selected characteristic of a portion of a film sheet as it moves intermittently in said registry, and means responsive to the detection of said selected characteristic for rapidly moving said film sheet when said selected characteristic is detected.

18. The apparatus of claim 17 wherein said sensing means includes a pair of sensing devices positioned to detect a surface characteristic along an edge of said film sheet, said moving means being actuated to rapidly move said film sheet when either of said pair of sensing devices detects said selected surface characteristic at said edge of the film sheet.

19. The apparatus of claim 18 further including a third sensing device positioned to detect a surface characteristic of a portion of said moving means, said moving means being actuated to rapidly move said film unit when said third sensing device detects said selected surface characteristic at said portion of said moving means.

20. The apparatus of claim 19 wherein said moving means includes motor means; movable belt means capable of moving said film unit; first means coupling said motor means and said belt means for moving said film unit at a first intermittent rate when said film unit is in said registry position; and second means coupling said motor means and said belt means for rapidly moving said film unit at a higher rate than said intermittent rate, said second coupling means being actuated when any of said pair of sensing devices or said third sensing device detects said selected surface characteristic.

21. The apparatus of claims 18, 19 or 20 wherein said sensing devices are photodetection devices for detecting light reflective characteristics.

22. A method of projecting motion pictures for use with at least one sheet of film having images recorded thereon in a plurality of arcuate rows spaced along a given direction in said film sheet, said method comprising the steps of:
   supporting said sheet of photographic film at a given location in a given film plane;
   illuminating said images by moving a beam of illumination in an arcuate path conforming to said arcuate path of a row of images;
   directing light from said images by simultaneously moving at least a portion of an optical arrangement, for directing light from each image to a viewing screen, into registration with each image while the image is being illuminated;
   advancing said film sheet, at the completion of said arcuate row, in a direction substantially normal to said arcuate path and a distance equal to the distance between image rows to provide an unprojected image row in said spaced areas; and
   repeating said illuminating step, said directing step and said advancing step to project each of said image rows in said film sheet.

23. The method of claim 22 wherein progression of said illuminating step and said directing step along said arcuate path is alternately reversed.

24. The method of claim 22 wherein said photographic sheet is rectangular, said illuminating step and said directing step include moving said beam of light and said portion of said optical means along an arcuate path substantially normal to one major axis of said rectangular sheet, and said advancing step includes advancing said film sheet in a direction substantially parallel to said one major axis.

* * * * *